(12) United States Patent
Kohlstrand

(10) Patent No.: US 8,282,225 B2
(45) Date of Patent: Oct. 9, 2012

(54) ACTIVE BLINDSPOT/LANE DEPARTURE DETECTION MIRROR SYSTEM

(75) Inventor: Kelly Michael Kohlstrand, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 12/397,431

(22) Filed: Mar. 4, 2009

(65) Prior Publication Data
US 2010/0226027 A1    Sep. 9, 2010

(51) Int. Cl.
*G02B 5/08*    (2006.01)
*G02B 7/18*    (2006.01)
*G02B 5/30*    (2006.01)
*G02B 27/28*    (2006.01)

(52) U.S. Cl. .................. 359/843; 359/844; 359/484.01; 359/485.07

(58) Field of Classification Search .................. 359/843, 359/844, 484.01, 485.07
See application file for complete search history.

(56) References Cited

U.S. PATENT DOCUMENTS

| 6,315,419 | B1 | 11/2001 | Platzer, Jr. | |
| 6,927,894 | B2 | 8/2005 | Blum et al. | |
| 7,092,144 | B2 | 8/2006 | Blum et al. | |
| 7,525,604 | B2 * | 4/2009 | Xue | 349/16 |
| 2006/0262383 | A1 | 11/2006 | Blum et al. | |
| 2008/0304170 | A1 * | 12/2008 | Zhao | 359/864 |
| 2009/0058677 | A1 * | 3/2009 | Tseng et al. | 340/904 |

* cited by examiner

*Primary Examiner* — Jade R Chwasz
(74) *Attorney, Agent, or Firm* — Franklin MacKenzie; Ford Global Technologies, LLC

(57) ABSTRACT

A system and method to polarize a reflective layer on a vehicle mirror to reveal a convex mirror to view objects in a vehicle blindspot includes a primary mirror having first and second surfaces, an electrically polarizable reflective coating on at least a portion of the first surface reflective in a depolarized state and clear when polarized by an applied electric current, a blind zone viewing convex mirror adjacent to the second surface and proximal to the polarizable coating of the first surface; and a blind spot detection system electrically connected to the primary mirror and a power source to automatically apply current to the first surface when an object is detected in a blind spot and change the reflectivity polarizable coating on the first surface and expose the concave mirror and discontinuing current to the reflective coating once an object has passed out of the blind spot.

10 Claims, 4 Drawing Sheets

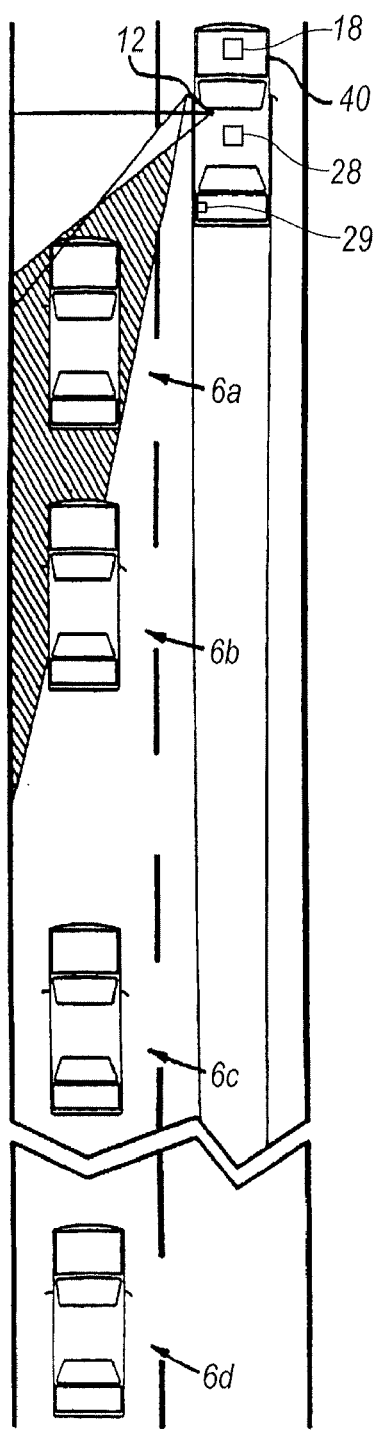
FIG. 4
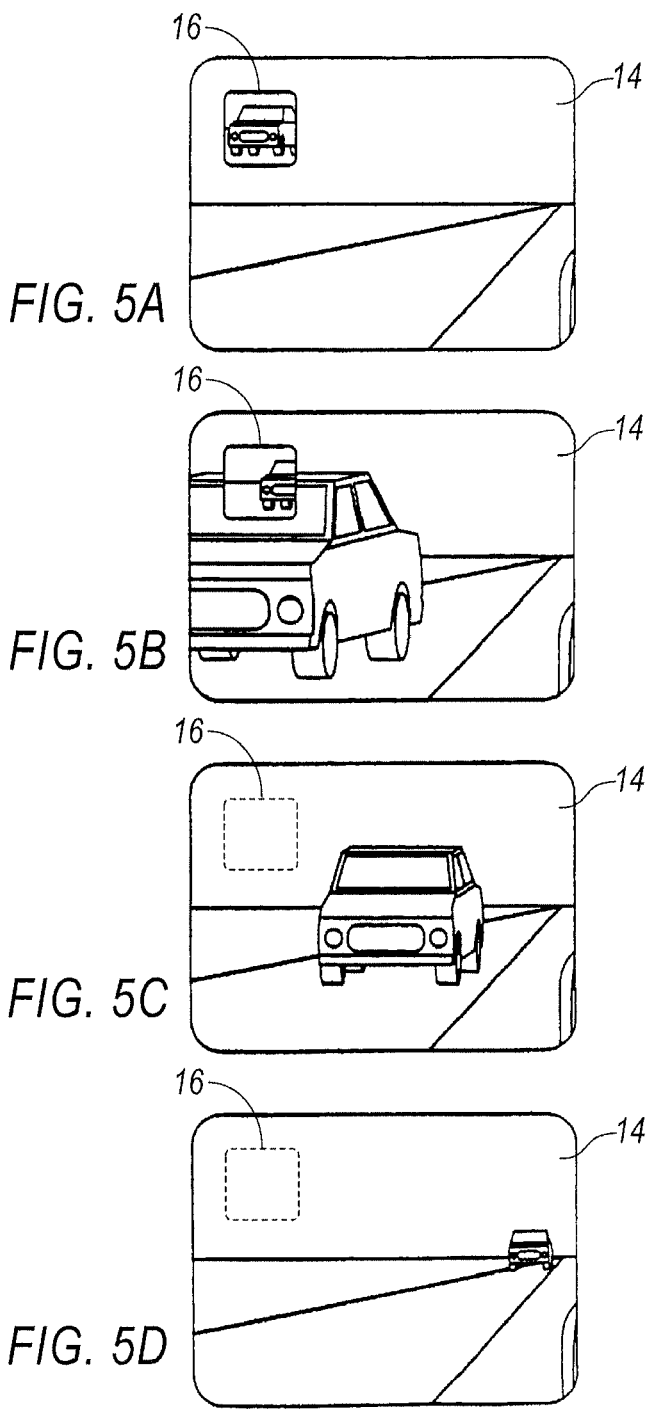
FIG. 5A
FIG. 5B
FIG. 5C
FIG. 5D

ACTIVE BLINDSPOT/LANE DEPARTURE DETECTION MIRROR SYSTEM

TECHNICAL FIELD

The present application generally relates to a bindspot/lane detection system in connection with at least one mirror having a polarizable reflective surface along at least a portion of the mirror reflective surface that is substantially clear in a polarized stated, but resumes its reflective qualities when in a depolarized state.

The present application further relates to a host vehicle mirror equipped with a convex mirror surface located in the vehicle side mirror blind spot, and such that the polarizable reflective surface is located over the convex mirror surface adjacent or affixed to the vehicle mirror surface. When an object is detected in the host vehicle blind spot, or an object is detected in an adjacent lane during a lane change event, and it is determined that the detected object is gaining in velocity relative to the host vehicle, a current is applied to the polarizable reflective surface that make the surface substantially clear, thereby exposing the convex mirror and permitting the operator to actually see the object in the vehicle blind spot. Once the object is no longer in the vehicle blind spot or no object is detected in the adjacent lane, the current is ceased, and the mirror returns to its normal depolarized state that causes the reflective surface to resume its reflectivity.

SUMMARY

In one embodiment, the present application is directed to a vehicle mounted mirror system to automatically reflect light from a vehicle blind spot toward a driver. The system includes a primary mirror having a first surface and a second surface, an electrically polarizable reflective coating on at least a portion of its first surface; said polarizable reflective coating being reflective in a depolarized state and substantially clear when polarized by an electric current applied thereto; a blind zone viewing convex mirror adjacent to said second surface and proximal to said polarizable coating portion of said first surface; and a blind spot/land departure detection system electrically connected to the primary mirror and a power source adapted to automatically apply current to polarize said primary mirror first surface when an object is detected in a blind spot and change the reflectivity of the reflective polarizable coating on at least a portion of the primary mirror first surface and expose the concave mirror to reflect light from the blind spot to the vehicle driver to permit the driver to see the object in the blind spot; said blind spot detection system discontinuing current to the primary mirror thereby depolarizing the mirror surface once an object has assed out of the blind spot.

The reflective coating is polarized when by a blind spot detection system electrically connected to the primary mirror and a power source adapted to automatically apply current to polarize the primary mirror first surface when an object is detected in a blind spot and change the reflectivity of the reflective polarizable coating on at least a portion of the primary mirror first surface and expose the concave mirror to reflect light from the blind spot to the vehicle driver to permit the driver to see the object in the blind spot. Once the object passes through the blind spot, the blind spot detection system discontinues current to the primary mirror thereby depolarizing the mirror surface once an object has passed out of the blind spot. The blind spot detection system may utilize radar, sonar or lidar to detect objects in the vehicle blind spot.

In another embodiment, the present application relates to a method to operate a mirror system to reflect light from a vehicle blind spot toward a driver. The method includes at least the steps of detecting an object in a vehicle blind spot; determining whether the detected object is keeping pace or gaining on said vehicle; applying an electric current to a polarizable reflective layer on a mirror to alter reflectivity of the mirror on at least a portion of the mirror to expose a convex mirror capable of viewing objects in the vehicle blind spot. Optionally, the method may further include depolarizing the mirror reflective layer when the sensed object leaves the vehicle blind spot, thereby resuming normal reflectivity of the vehicle mirror surface.

BRIEF DESCRIPTION OF THE DRAWINGS

FIG. 4 is a representation of a plan view of a two lane highway showing a vehicle in the right lane equipped with the mirror of FIG. 1 and the blindspot/lane departure detection system of FIG. 3, depicting the four positions of an overtaking vehicle in the left lane;

FIG. 5a is a schematic representation of the image of an overtaking vehicle in a mirror like that of FIG. 1;

FIG. 5b is like that of FIG. 5a, except that the overtaking vehicle is farther to the rear;

FIG. 5c is like that of FIG. 5b, except that the overtaking vehicle is farther to the rear;

FIG. 5d is like FIG. 5c except that the overtaking vehicle is farther to the rear;

DETAILED DESCRIPTION

Figure 1:
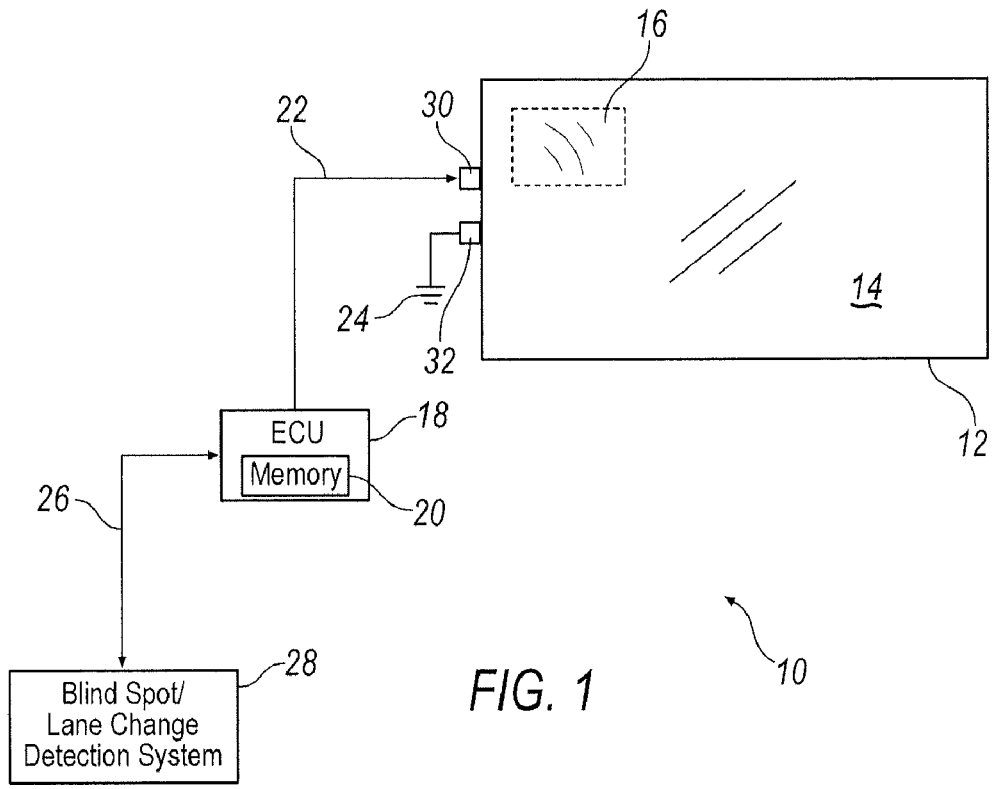
FIG. 1 is a schematic representation of one system to activate a polarizable mirror according to one aspect of the present application.
Figure 2:
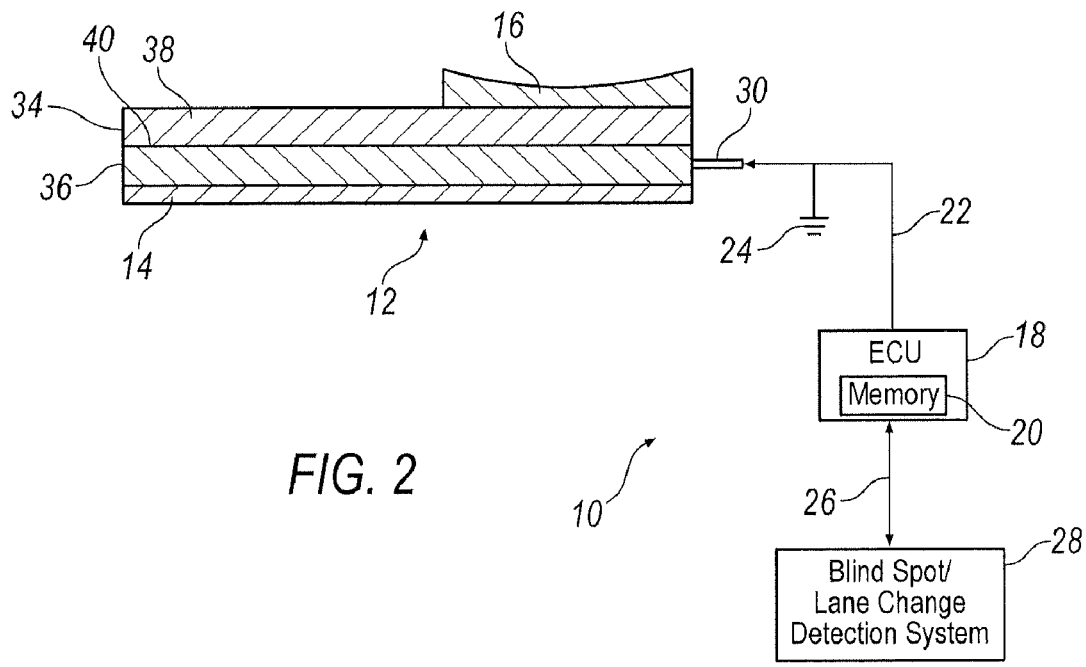
FIG. 2 is a schematic representation of the system of FIG. 1, showing the layered construction of the mirror according to one aspect of the present application.

Referring now in greater detail to the drawings, and specifically FIG. 1 and FIG. 2, there is shown a schematic representation of a system showing the components of a rear view mirror according to one embodiment of the present application. System 10 is represented schematically, comprised of polarizable coated mirror 12, having a transparent coating surface 14 that overlies an electrically conductive surface 36 that is reflective in its unexcited state, and, upon the application of a current through electrodes 30 and 32, becomes clear to reveal convex mirror 16 affixed to a transparent substrate 34 at an opposite side from the coated surface, adapted to permit an operator to view objects in the vehicle blind spot. The transparent coating surface 14 may be an optically transparent abrasion resistant coating such as a siloxane. Several companies including G. E. Silicones (Waterford, N.Y.) and Dow Chemical Co (Midland, Mich.) manufacture siloxanes used as transparent hard coats on plastics.

As previously stated, the mirror assembly 12 has a first transparent substrate 14 and a second opposed transparent substrate 34, with the polarizable reflective coating 36 disposed therebetween. The convex mirror 16 may located on the second opposed surface 38 of the second transparent substrate and the polarizable coating is located on the first surface 40 of second transparent substrate of the mirror assembly, as will be described hereinafter. It is appreciated that the convex mirror may be placed on the first surface of the second transparent layer and dimensioned such that it is subsumed in the polarizable coating. Generally, the convex mirror may be constructed as set forth in U.S. Pat. No. 6,315,419, which is incorporated herein be reference and if fully set forth. The mirror is electronically connected at terminals 30 and 32 to an electronic control unit (ECU) 18 that has memory 20, wherein reside operating instructions to polarize the mirror reflective surface 36 in cooperation with the blind spot or lane change detection system 28 in a manner to be hereinafter described. The ECU controls the application of current to the mirror polarizable surface 36 upon detection of objects in the vehicle blind spot or upon detection of a lane change departure. The current is supplied by a battery 24. The ECU is in electronic communication 26 with the vehicle blind spot detector and/or the vehicle lane detection system 28, or both, depending upon the manner in which the vehicle is equipped. When the appropriate signal is received in the ECU, the polarizable layer 36 is electrically excited, thereby causing the polarizable coating to become clear along at least a portion of its length and width, revealing the convex mirror 16 attached to the second transparent substrate. This permits the operator to view objects in the blind spot without distraction. When the vehicle has passed from the blind spot, or the lane departure has been completed or corrected, the current ceases, and the polarizable layer becomes depolarized, thereby resuming its reflective state and concealing the convex mirror. The driver is then able to use the mirror in the depolarized state in the same manner as a conventional side view mirror.

The polarizable layer is comprised of a liquid crystal material that may, when exposed to a voltage, change its index of refraction such that when light enters the active zone an the polarizable layer is activated, the reflective properties of the reflective surface may be modified. The surface 14 in this embodiment can be made from optical grade glass, plastic, or a combination of glass and plastic, for example. The back of this surface 14 may be coated with a transparent conductor such as ITO, tin oxide, or other electrically conductive and optically transparent materials, to form electrodes 30 and 32.

The electrodes may be coated with an alignment layer to provide orientation to the liquid crystal, or other variable index polymeric material layer. The molecules in the liquid crystal layer generally change their orientation in the presence of an applied electrical field, resulting in a change in the index of refraction experienced by an incident ray of light. The polarizable layer is generally a liquid crystal layer, and may be nematic, smectic, or cholesteric, for example. Exemplary nematic phase crystals include 4-pentyl-4'-cyanobiphenyl (5CB) and 4-(n-octyloxy)-4'-cyanobiphenyl (8OCB). Other exemplary liquid crystals include the various compounds of 4-cyano-4'-(n-alkyl)biphenyls, 4-(n-alkoxy)-4'-cyanobiphenyl, 4-cyano-4"-(n-alkyl)-p-terphenyls, and commercial mixtures such as E7, E36, E46, and the ZLI-series made by BDH (British Drug House)-Merck.

Figure 3:
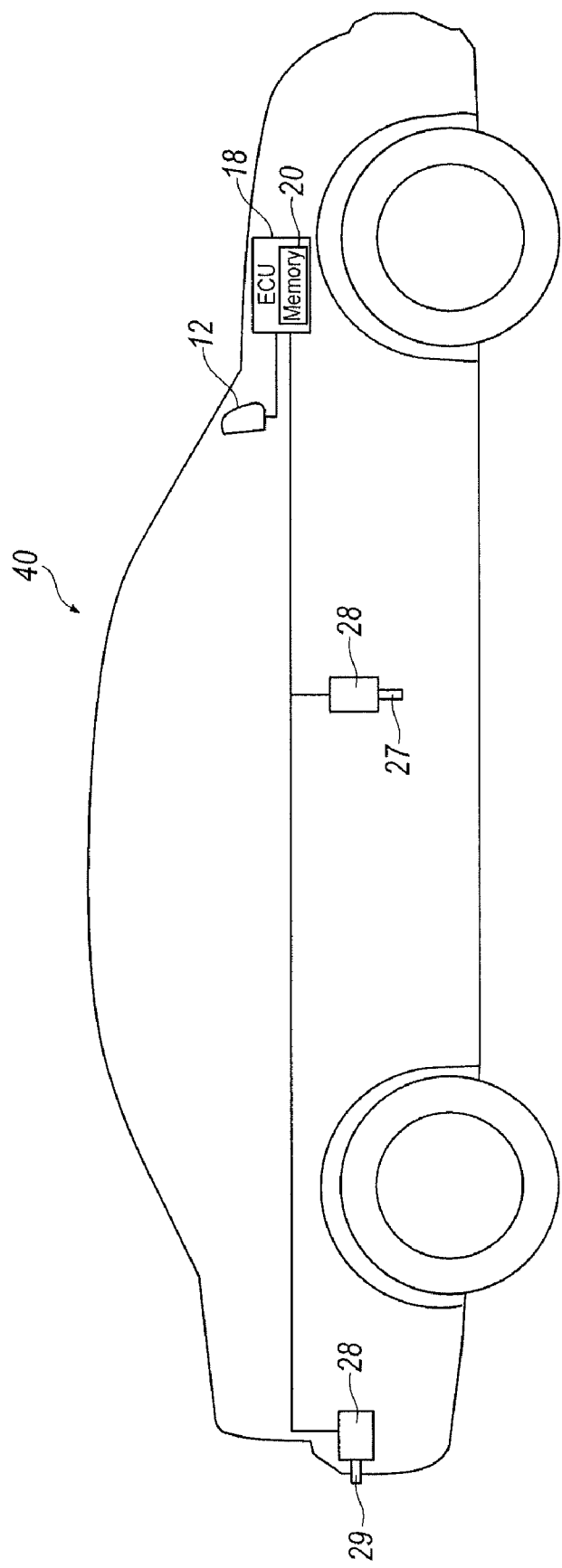
FIG. 3 plan view of an automobile depicting a vehicle blind spot/lane departure detection system together with the outside polarizable mirror of FIGS. 1 and 2.

FIG. 3 shows a host vehicle 40 is equipped with a driver's side outside mirror 12 as described in relation to FIGS. 1 and 2 above, together with an ECU 18 and blind spot detection/lane departure detection system 28. Note that a restraint control module (RCM) may also be used as the module wherein data signals indicative of vehicle lane travel or objects in the vehicle blind spot could be processed, and the polarizable mirror could be polarized by a signal generated from the RCM. It should be appreciated that any electronic module capable of processing the data signals received from the sensors indicative of objects in the blind spot or lane departure data could be used for the purpose of controlling the polarization of the mirror reflective surface to expose the convex mirror to the operator. The vehicle blind spot/lane departure detection system includes sensors 27 and 29, respectively, to generate data signals indicative of vehicle condition such as lane change in the case of a lane departure detection system, or of the detection of an object in the blinds spot of a vehicle, or, as further may be the case, booth of these functions can be joined into a single system. The vehicle blind spot/lane departure detection system relies upon radar, lidar or sonar to generate data signals indicative of whether the vehicle is changing lanes or whether an object is in the vehicle blind spot.

FIG. 4 shows an overtaking vehicle at various distances behind vehicle 40 of FIG. 4. FIGS. 5a, 5b, 5c and 5d show the position of the image of the overtaking vehicle on mirror 12 in FIG. 4. FIG. 5d shows the image of the overtaking vehicle at a position 6d in FIG. 4 about 12 car lengths to the rear of vehicle 40. Note that a small portion of the left rear fender of vehicle 40 is seen in the lower right-hand corner of the plane main mirror. FIG. 5c shows the image of the vehicle at a position 6c about 3.5 car lengths to the rear. FIG. 5b shows the image of the vehicle at position 6b about 1.25 car lengths back, and it is seen mostly in the plane main viewing portion of the mirror, but partially in the auxiliary blindzone-viewing portion. FIG. 5a shows the image of the overtaking vehicle in position 6a, which is entirely in the blindzone, and it is seen that the image is entirely in the blindzone-viewing mirror. Thus, the image of the approaching vehicle moves from inside to outside across the mirror, and this is one reason why the auxiliary mirror is placed in the upper and outer quadrant of the rearview mirror. Placing it on the inner quadrant would disturb the apparent flow of the image of the overtaking vehicle as it moves across the main mirror from inside to outside. In each of the FIG. 5a through 5c, attention should be paid to the convex mirror 16. When the vehicle is detected in the vehicle blind spot, or when a lane departure is detected, such as illustrated at FIGS. 5a and 5b, the polarizable layer is excited by application of a current, an the reflectivity of at least a portion of the reflective layer is changed to clear so that convex mirror 16 is exposed. The operator then views the object detected in the convex mirror 16 while the object is in the vehicle blind spot. After the detected vehicle has passed out of the vehicle blindspot, as in FIGS. 5c and 5d, the polarizable layer is depolarized, and resumes its reflectivity. The convex mirror 16 is then hidden from view, and the vehicle operator can use the side view mirror without distraction of the image in the convex mirror.

As set forth above, the primary mirror surface is coated with a polarizable reflective coating that, when excited by application of a current, changes reflectivity and become substantially clear, and depolarizes when the current is disconnected, thereby returning to the reflective state. When an object is detected in a vehicle blind spot, a signal is generated to the controller 18. A determination is made in the controller whether the detected object is keeping pace with or approaching the vehicle. If it is determined that the object is keeping pace with or approaching the vehicle, a signal is generated that applies current to the polarizable coating, thereby exciting the coating and changing the reflectivity of the reflective surface, or at least at the area wherein the convex blind zone mirror is located. When the reflective coating is polarized, the detected object can then be seen by the operator or driver of the vehicle by viewing the exposed convex mirror to see the object the blind spot. The driver can then take appropriate action in operating the vehicle in repose to a visual confirmation that there is an object in the blind spot of the vehicle.

Figure 6:
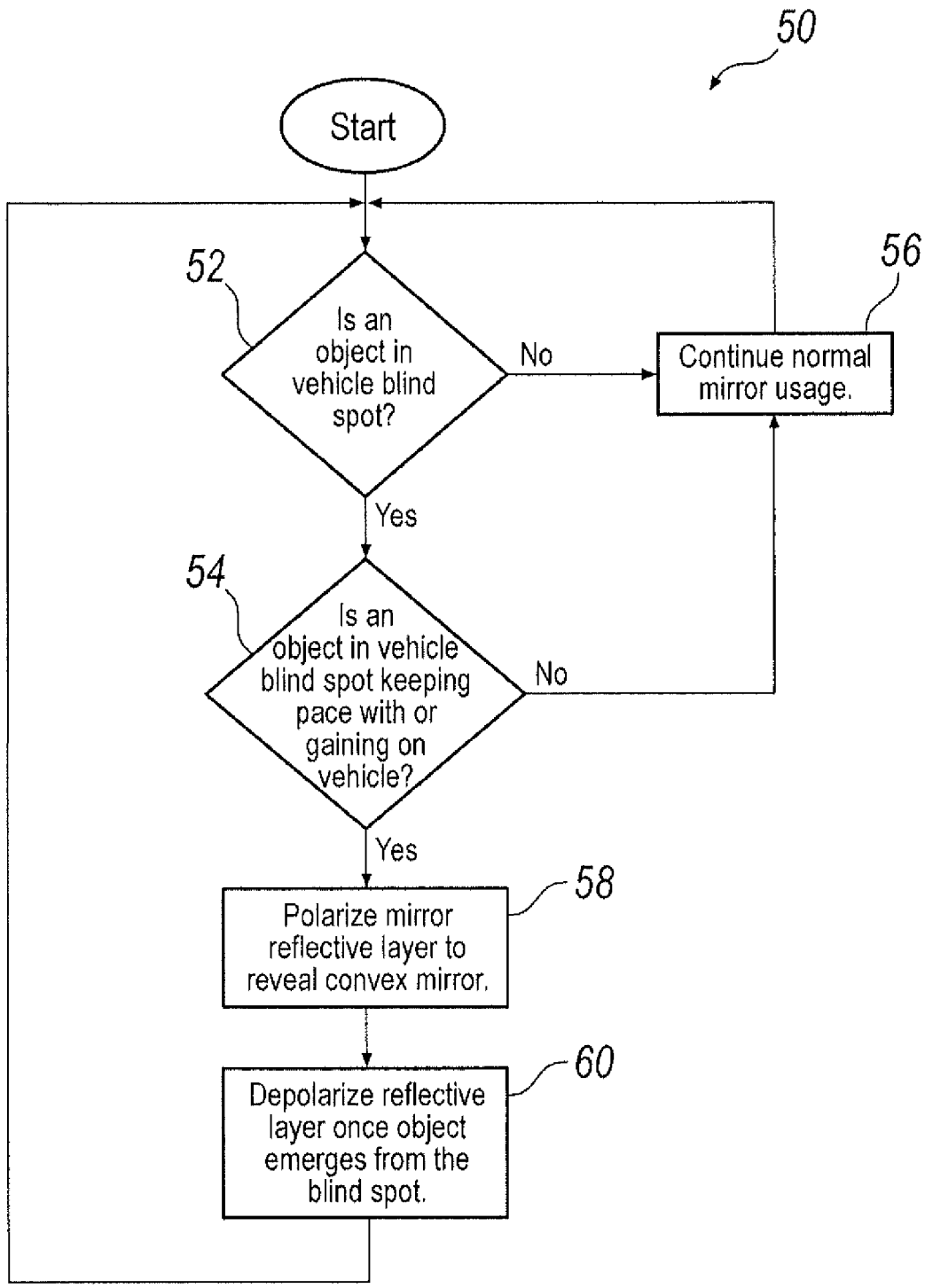
FIG. 6 is a schematic representation of a software flowchart showing one method to activate the polarizable mirror according to one aspect of the present application.

FIG. 6 is a representation of one embodiment of a method 50 to alter polarization of the reflective layer of the mirror responsive to whether an object is detected in the vehicle blind spot or whether it is determined that a lane change departure is detected. Step 52 is detecting an object in a vehicle blind spot, or determining whether a lane departure is detected. If it is determined there is no object in the vehicle blind spot, or that there is no lane change, the method proceeds to step 56, which is continue normal vehicle mirror usage. If it is determined that either an object is found in the vehicle blind spot or a lane change departure is detected, the method proceeds to step 54, which is determining whether the detected object is keeping pace or gaining on the vehicle. If it is determined that the detected object is not gaining on the vehicle, the method proceeds to step 56, which is continue normal operation of the vehicle mirrors. If the determination is step 54 is affirmative, step 58 is applying an electric current to a polarizable layer to polarize at least a portion of the layer to change reflectivity of the polarizable layer to expose a convex mirror through which the operator may actually view objects in a vehicle blind spot and upon termination of application of electricity, the polarizable layer resumes reflectivity. Optional step 60 is returning the mirror to normal operation by depolarizing the polarizable layer. The method is contemplated to closed loop, with the continuous operation of the method as described.

Those skilled in the art recognize that the words used in this application are words of description, and not words of limitation. Many variations and modifications may be made to the concepts set forth in this application without departing from the scope and spirit of the application, as set forth in the appended claims.

We claim:

1. A vehicle mounted mirror system to automatically reflect light from a vehicle blind spot toward a driver, comprising:
 a primary mirror having a first surface and a second surface, a convex mirror adjacent said second surface; said convex mirror located to provide operator viewing of objects from said blind spot; an electrically polarizable reflective coating on at least a portion of its-first surface overlaying said convex mirror; said polarizable reflective coating being reflective in a depolarized state and substantially clear when polarized by an electric current applied thereto; and
 a blind spot detection system electrically connected to the primary mirror and a power source adapted to automatically apply current to polarize said primary mirror first surface overlying said convex mirror when an object is detected in a blind spot and change the reflectivity of the reflective polarizable coating on at least a portion of the primary mirror first surface and expose the convex mirror to reflect light from the blind spot to the vehicle driver to permit the driver to see the object in the blind spot; said blind spot detection system discontinuing current to the primary mirror thereby depolarizing the mirror surface over the convex mirror once an object has passed out of the blind spot.

2. The mirror system of claim 1, wherein said blind spot detection system utilizes radar, sonar or lidar to detect objects in the vehicle blind spot.

3. The mirror system of claim 1, wherein the convex mirror is smaller than said primary mirror and located off center from the primary mirror center.

4. The mirror system of claim 1, wherein said mirror is protected with an optically transparent hard layer.

5. The mirror of claim 4, wherein the transparent hard layer is plastic or glass.

6. The mirror of claim 1, wherein the polarizable layer is selected from a nematic, smectic and cholestric liquid crystal layer.

7. The mirror of claim 1, wherein said first layer is coated with an electrically conductive and optically transparent conductor to form electrodes.

8. The mirror of claim 1, wherein said first layer is coated with indium tin oxide (ITO), tin oxide, or other electrically conductive and optically transparent materials to form electrodes.

9. The mirror system of claim 1, wherein the primary mirror and the blind zone mirror are an integral structure.

10. A method to operate a mirror system to reflect light from a vehicle blind spot toward a driver, comprising:
 detecting an object in a vehicle blind spot;
 determining whether the detected object is keeping pace or gaining on said vehicle;
 applying an electric current to a polarizable layer to polarize at least a portion of the layer to change reflectivity of the layer expose a convex mirror through which the operator may actually view objects in a vehicle blind spot and upon termination of application of electricity, the polarizable layer resumes reflectivity.

* * * * *